Sept. 7, 1948.                W. R. McKENZIE                2,448,902
                           NUT LOCK CONSTRUCTION
                            Filed April 3, 1944
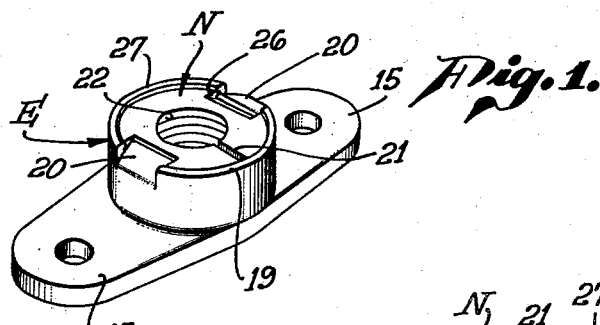
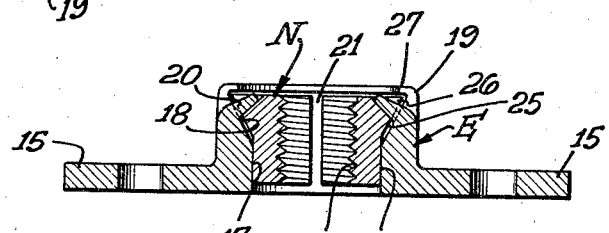
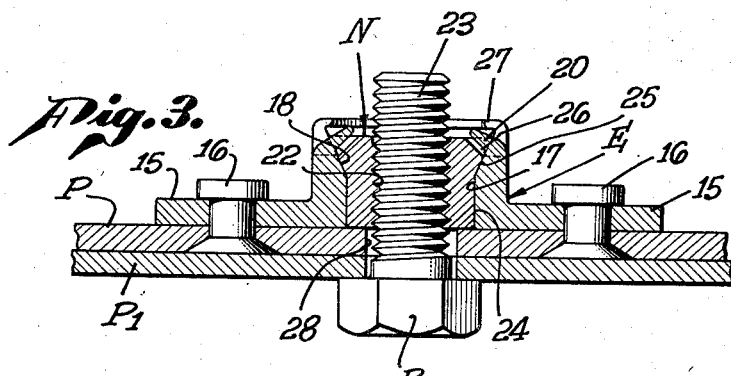
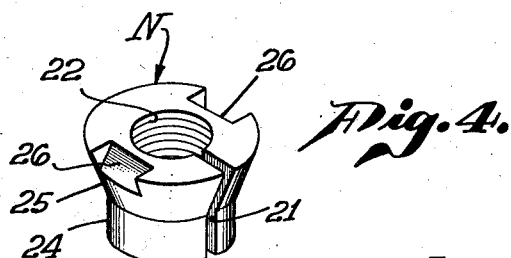
WENDELL R. McKENZIE,
              INVENTOR.
BY Edwin D. Jones.
              ATTORNEY.

Patented Sept. 7, 1948

2,448,902

UNITED STATES PATENT OFFICE 2,448,902

NUT LOCK CONSTRUCTION

Wendell R. McKenzie, Claremont, Calif., assignor to Bank of America National Trust and Savings Association, Los Angeles, Calif., a National Banking Association Application April 3, 1944, Serial No. 529,307

5 Claims. (Cl. 151—19)

My invention relates to nut lock constructions of the character embodied in the United States Patent No. 2,361,979 of November 7, 1944, granted to Lawson Tarwater and myself, which are particularly designed for use in connection with bolts for securing together the plate structures of aircraft fuselages and wing constructions, and which include a tapered and split lock nut, to render it constrictable, and a constricting element having a conical bore for constricting the lock nut to lockingly embrace the bolt.

It is a purpose of my present invention to provide a nut lock construction of the above described character in which the lock nut and the constricting element are functionally related to set up inward radial or lateral pressures which attain a maximum at the outer end of the nut, and operate to securely lock the bolt against loosening under the most severe vibrations, as well as under all temperatures and particularly extremely low temperatures such as exist in the stratosphere.

A further purpose of my invention is the provision of a nut lock construction in which the secure locking of all intermeshing bolt and nut threads is effected in two stages, and in such manner that the nut and bolt threads do not become galled, burred, or otherwise injured in a way that will prevent repeated reuse of my nut lock construction and the bolt. Also, that the locking action afforded is produced by such lateral pressures as to force the nut threads into the bolt threads so as to cause the load carrying sides of both threads to have firm contact with each other, and whereby all relative axial play of nut and bolt is absorbed, while the effective strength of the threads is so increased as to resist axial strains and prevent stripping of the threads.

A further purpose of my invention is to provide a construction in the operation of which the final clamping or locking movement is subjected to the action of a stop which effects the arrest of one of the moving parts, thereby indicating a stopping point for the application of the final locking force. This assists in preventing accidental shearing of the threads in a locking movement, makes for uniformity in the clamping action of the lock effect and prevents the threads from being subjected to a more than reasonable shearing stress.

It is also a purpose of my invention to provide a nut lock construction in which the lock nut and constricting element are of such conicity that when intentionally unscrewing the bolt the lock nut will release the bolt and thus eliminate the necessity of tapping the bolt to effect its release.

I will describe only one form of nut lock construction embodying my invention and will then point out the novel features thereof in claims.

In the accompanying drawings:

Fig. 1 is a view showing in perspective one form of nut lock construction embodying my invention.

Fig. 2 is a vertical longitudinal sectional view of the nut lock construction shown in Fig. 1.

Fig. 3 is a view similar to Fig. 2 showing the nut lock construction applied to a bolt and a plate structure through which the bolt extends.

Fig. 4 is an enlarged detail perspective view of the inner nut member of the lock nut shown in the preceding views.

The nut lock construction as illustrated in the present drawing, comprises an inner nut-member N, and an outer nut-member E, the function of which is to constrict the inner nut-member. In the present instance, the outer nut-member E is in the form of a holder adapted to seat at its inner end on, and be attached to, a part to be clamped such as a portion of the plate structure of an aircraft such as the plate P in Fig. 3, diametrically opposed ears 15, 15 are formed on the base or inner end of the collar, and these ears are preferably tapered and formed with openings through which rivets 16 are extended for securing the ears to the plate.

The inner surface of the collar or shell member E has an inner portion or bore 17 which is straight, that is, its elements are in parallelism with the bore axis, and an outer portion or counterbore 18 which is tapered to provide a frustated conical surface which terminates at its outer end in a relative thin edge 19. Diametrically opposed lugs or tongues 20, 20 are formed on the outer end of the collar E, for securing the lock nut N against rotation in the collar, and these lugs, while originally straight, are bent inwardly following placement of the lock nut in the collar.

The lock nut N as well as the collar E, is preferably formed of tempered steel to lend resiliency thereto, and as illustrated, the lock nut is split throughout its entire length, as indicated at 21, in order to allow constriction thereof to lockingly embrace the shank of a bolt B threaded through the nut. The bore 22 of the lock nut is screw-threaded to engage the threads 23 of the bolt, while the outer surface of the nut has a straight, cylindrical inner portion or neck 24 and a head with a conical outer surface or portion 25.

The inner nut-member N and the outer nut-member E have correlated means operating to prevent their rotation relative to each other. This will now be described.

To receive the lugs 20 of the constricting element E, once the nut is placed within the element, and to thereby secure the nut against rotation in the element, as well as to confine the nut in the element, the nut at its outer end is formed at diametrically opposed points with recesses 26 of such depth that the side walls thereof engage the side edges of the lugs when bent inwardly. Also, the lugs when bent confine the nut against displacement outwardly from the collar.

Before proceeding to a description of the mode of assembly of the nut and collar, and their manner of functioning, it should be explained that the construction of the two permits them to be made relatively short and yet highly effective in their locking and releasing functions. Also, that the diameter of the straight portion or neck 24 of the nut as manufactured is greater than the diameter of the straight portion 17 of the collar. This diameter differential is such that when the nut is inserted into the collar it will be partially constricted (Fig. 2). This preliminary construction is possible by reason of its inherent resiliency.

Another structural feature of my nut lock construction and one that contributes to its rapid and secure locking action and its easy release without tapping the bolt, is the conicity of the portions 18 and 25. The generatrix of the walls of these portions describe an angle of substantially 65 degrees. That is to say, the conical portions 18 and 25 are disposed on an angle of substantially 65° relative to the base of the cone. This abrupt taper also affords a reduction in the number of threads in the nut, and the use of a shorter nut, and consequently a shorter bolt. This is because with this 65° taper for the conical engaging faces it would be necessary to have a nut head of very large diameter in order to have requisite thickness for the lower end of the nut in its straight portion. This enables me to employ relatively blunt conical surfaces which is a highly advantageous feature in enabling the nut lock to adjust itself to changes in temperature without danger of injuring the constricting element, for example, wherever there is a sudden increase in temperature; and it also enables me to construct the nut so that it can have substantially the depth of a standard nut in which the depth of the nut is approximately equal to the diameter of the bolt that is received in the nut.

In assembling the nut and collar, the straight end 24 of the nut is forced into the collar to substantially the position shown in Fig. 2, wherein the conical portions 18 and 25 are out of contact with each other or just in contact. This effects an initial and partial constriction of the nut which is insufficient to prevent freely screwing of the bolt into the nut.

Once the nut is inserted as described, the lugs 20 are bent inwardly, and then the edge 19 of the collar is inturned to form lips 27 between the lugs to not only seal the joint between the nut and collar and thus reduce the entrance of water to prevent the resultant corrosion, but to assist the ears 20 in securing the nut against possible extrusion when threading the bolt through the nut.

In practice, the collar E is riveted to the plate P so that its bore is coaxial with registering openings 28 in the plate. It will be understood that the plates P and P1 constitute a part of an aircraft structure.

With my nut lock construction so applied the bolt may now be readily screwed into the nut, in spite of its preliminary constriction through its initial insertion into the collar. In point of fact this preliminary nut constriction is sufficient to effect the attachment of the bolt in the nut in the regular way, as the first of two locking stages as this occurs before the conical portions of the nut and collar coact to effect the tightening and final locking stage. This final locking stage maintains the bolt against loosening under those rates of vibration of the aircraft as normally exist, as well as under all temperatures existing when the aircraft is not in the stratosphere.

This second and final locking stage is produced by screwing the bolt further into the nut to bring the conical surface 25 into firm and forceful contact with the conical surface 18, and thereby effect further constriction of the conical portion of the nut. The parts of my nut lock construction are so co-ordinated that this constriction of the nut takes place only in the final turning of the bolt or when the inner end of the nut impinges upon, and is drawn into firm contact with the plate P, and the plates P and P1 into firm contact with each other. Hence the plate P acts as a stop for the locking rotation of the bolt. With this constriction of the conical part of the nut further constriction of the straight portion is also effected, and the combined action is such as to set up inward radial pressures of such intensity as to force the nut threads into the bolt threads and thereby cause the load carrying sides of both nut and bolt threads to have intimate and firm contact with each other. As a result all relative axial play of the nut and bolt is absorbed, while the effective strength of the nut and bolt threads is so materially increased as to successfully resist all axial strains, and prevent the possibility of thread stripping.

Furthermore, the security of the locking action is such as to prevent loosening of the bolt under all conditions of vibration, and under extremely low temperatures such as exist in the stratosphere. This latter advantage is an important feature of my invention, for in previous nut lock constructions loosening of the bolt occurs by reason of the high degree of contraction of the various metal parts resultant of the extremely low temperatures.

Due to the fact that this second and final stage of locking is secured just at the final turn of the bolt, and also because of the abrupt conicity of the conical portions 18 and 25 as previously described herein, it requires only one turn of the bolt in the other direction to relieve it of the second stage of locking, because the conical nut portion now springs to an expanded position. With the bolt relieved of this second locking stage, it can be easily unscrewed from the nut.

By effecting locking of the bolt in two stages as described, any galling or abrasive action of the nut and bolt threads such as to preclude repeated use of the bolt and my nut lock construction, is prevented. This advantage is achieved by reason of the fact that the first constricting stage of the nut resulting from inserting its straight portion 24 into the straight bore portion 17 of the collar does not set up such an inward radial pressure as to produce galling of the threads under screwing movement of the bolt, and the final turn of the bolt to effect the second constriction of the nut is insufficient to produce thread galling.

It will also be evident that by reason of the fact that the nut is split throughout its entire length by the slot 21, the cylindrical portion of the nut does not operate as it would if it were a solid continuous ring, or annulus, to restrict the free inward movement of the tapered collar portion of the nut. Furthermore, when the bolt is tightened up no constricting force or compressive force is exerted by the nut holder against the outer surface of the cylindrical portion of the nut. Hence, all of the constricting pressure is applied to the outer end of the nut. This constrictive pressure, of course, produces some distortion of the periphery of the bolt at the outer end of the nut. In other words, this end of the nut tends to "bite in" to the threads of the bolt and is very effective in overcoming any tendency of the bolt to work loose.

Although I have herein shown and described only one form of nut lock construction embodying my invention it is to be understood that various changes and modifications may be made herein without departing from the spirit of my invention and the spirit and scope of the appended claims.

I claim:

1. In a nut lock construction, the combination of: an outer nut holding shell member having an inner end adapted to be seated against the surface of a part to be clamped, said shell having a bore extending therethrough including a cylindrical portion at the inner end and an enlarged frusto-conical seat portion at the outer end with its largest diameter nearest said outer end; an inner nut member disposed in said shell member, said nut member being split throughout its length along one side thereof and also having a cylindrical neck portion normally of slightly larger diameter than the shell bore, said nut having a frusto-conical head to seat on the frusto-conical portion of the bore of said shell; screw threads formed in the bore of said inner nut member adapted to be engaged by the threads of the bolt which it is to receive; and means holding one of said members against turning relative to the other.

2. A nut lock construction as defined in claim 1 in which the base angle of the frusto-conical seat and the frusto-conical head is substantially 65 degrees.

3. In a nut lock construction, the combination of: an outer nut holding shell member having an inner end adapted to be seated against the surface of a part to be clamped, said shell member having a cylindrical bore the outer portion of which is frusto-conical with its largest diameter toward the outer end of said shell member; an inner nut member having a central bore which is threaded to engage the bolt to which the threaded nut member is to be applied, said threaded nut member having a cylindrical outer surface of such diameter that it can be inserted in the cylindrical bore of the shell member and be guided and positioned by said cylindrical bore, and threaded nut member also having a head provided with a surface portion of greater diameter than its cylindrical outer surface but of sufficiently small size to allow it to enter and engage with the frusto-conical portion of the bore of said shell member, said threaded nut member being split throughout its length along one side thereof; and a projection extending from one of said members into a cavity in the other member for preventing relative turning.

4. In a nut lock construction, the combination of: an outer nut holding shell member having an inner end adapted to be seated against the surface of a part to be clamped, said shell member having a cylindrical bore the outer portion of which is frusto-conical with its largest diameter toward the outer end of said shell member; an inner nut member having a central bore which is threaded to engage the bolt to which the threaded nut member is to be applied, said threaded nut member having a cylindrical outer surface of such diameter that it can be inserted in the cylindrical bore of the shell member and be guided and positioned by said cylindrical bore, said threaded nut member also having a head provided with a surface portion of greater diameter than its cylindrical outer surface but of sufficiently small size to allow it to enter and engage with the frusto-conical portion of the bore of said shell member, said threaded nut member being split throughout its length along one side thereof; means holding one of said members against turning relative to the other; and means for retaining said nut member in said shell member.

5. In a nut lock construction, the combination of: an outer nut holding shell member having an inner end adapted to be seated against the surface of a part to be clamped, said shell member having a cylindrical bore the outer portion of which is frusto-conical with its largest diameter toward the outer end of said shell member; an inner nut member having a central bore which is threaded to engage the bolt to which the threaded nut member is to be applied, said threaded nut member having a cylindrical neck portion of such diameter that it can be inserted in the cylindrical bore of the shell member and be guided and positioned by said cylindrical bore, said threaded nut member also having a head provided with a surface portion of greater diameter than its cylindrical neck portion but of sufficiently small size to allow it to enter and engage with the frusto-conical portion of the bore of said shell member, said threaded nut member being split throughout its length on one side thereof; means for retaining said nut member in said shell member; and a projection extending from one of said members into a cavity in the other member for preventing relative turning.

WENDELL R. McKENZIE.

REFERENCES CITED

The following references are of record in the file of this patent:

UNITED STATES PATENTS

| Number | Name | Date |
|---|---|---|
| 661,655 | Bryce | Nov. 13, 1900 |
| 1,116,095 | Mellis | Nov. 3, 1914 |
| 1,303,784 | Emery | May 13, 1919 |
| 1,467,824 | Ahlers | Sept. 11, 1923 |
| 1,597,698 | Tinker | Aug. 31, 1926 |
| 1,715,990 | Chaffee | June 4, 1929 |
| 1,739,286 | Bronson | Dec. 16, 1929 |
| 2,021,051 | Desbrueres | Nov. 12, 1935 |
| 2,234,557 | Hungerford | Mar. 11, 1941 |
| 2,264,561 | Bergman | Dec. 2, 1941 |
| 2,384,953 | Miller | Sept. 18, 1945 |

FOREIGN PATENTS

| Number | Country | Date |
|---|---|---|
| 475,334 | Great Britain | Nov. 17, 1937 |
| 116,503 | Australia | Feb. 11, 1943 |